(12) United States Patent
Sinusas et al.

(10) Patent No.: US 10,611,496 B2
(45) Date of Patent: Apr. 7, 2020

(54) POWER ALLOCATION SYSTEMS FOR AIRCRAFT

(71) Applicant: Textron Innovations Inc., Providence, RI (US)

(72) Inventors: Eric A. Sinusas, Euless, TX (US); Bradley Paul Regnier, Fort Worth, TX (US); Aaron Alexander Acee, Flower Mound, TX (US); Charles Hubert Speller, Flower Mound, TX (US); Marc Ouellet, Sainte-Sophie (CA)

(73) Assignee: Textron Innovations Inc., Providence, RI (US)

( * ) Notice: Subject to any disclaimer, the term of this patent is extended or adjusted under 35 U.S.C. 154(b) by 194 days.

(21) Appl. No.: 15/876,298

(22) Filed: Jan. 22, 2018

(65) Prior Publication Data

US 2019/0225349 A1 Jul. 25, 2019

(51) Int. Cl.
| | | |
|---|---|---|
| B64D 47/00 | (2006.01) | |
| H02J 4/00 | (2006.01) | |
| B64D 11/00 | (2006.01) | |
| B64D 13/08 | (2006.01) | |

(52) U.S. Cl.
CPC ............ B64D 47/00 (2013.01); H02J 4/00 (2013.01); *B64D 11/0015* (2013.01); *B64D 13/08* (2013.01); *B64D 2011/0038* (2013.01); *B64D 2221/00* (2013.01)

(58) Field of Classification Search
CPC ........ B64D 47/00; B64D 11/00; B64D 13/00; H02J 4/00; G07C 5/00; B64C 27/00
USPC .......................................................... 307/9.1
See application file for complete search history.

(56) References Cited

U.S. PATENT DOCUMENTS

| | | | | |
|---|---|---|---|---|
| 6,925,363 | B2* | 8/2005 | Hutton | H02J 3/14 |
| | | | | 307/31 |
| 9,536,358 | B2* | 1/2017 | Germanetti | B64C 27/04 |
| 2004/0057177 | A1* | 3/2004 | Glahn | H02J 3/14 |
| | | | | 361/62 |

(Continued)

FOREIGN PATENT DOCUMENTS

| | | |
|---|---|---|
| EP | 2879258 A1 | 6/2015 |
| WO | 2011081943 A2 | 7/2011 |

OTHER PUBLICATIONS

European Exam Report; Application No. EP 18157736.2; European Patent Office; dated May 8, 2018.

(Continued)

*Primary Examiner* — Hal Kaplan
*Assistant Examiner* — Joseph N Inge
(74) *Attorney, Agent, or Firm* — Lawrence Youst PLLC (57) ABSTRACT

A power system for an aircraft includes a plurality of power consumers each operable to consume power in a range from zero to maximum power demand and collectively capable of consuming a combined maximum power demand, a power source operable to output power to the power consumers and a power allocation system operable to allocate power from the power source to the power consumers based on an operational parameter of the aircraft. The power allocated by the power allocation system is less than the combined maximum power demand of the power consumers, thereby allowing the power source to have a maximum power output less than the combined maximum power demand of the power consumers.

20 Claims, 5 Drawing Sheets

(56) References Cited

U.S. PATENT DOCUMENTS

| | | | |
|---|---|---|---|
| 2009/0152942 A1 | 6/2009 | Waite et al. | |
| 2010/0102625 A1 | 4/2010 | Karimi et al. | |
| 2012/0232728 A1* | 9/2012 | Karimi | H02J 3/38 |
| | | | 701/22 |
| 2013/0297089 A1* | 11/2013 | Fu | G06F 1/26 |
| | | | 700/295 |
| 2014/0117148 A1* | 5/2014 | Dyrla | B64C 27/14 |
| | | | 244/17.13 |
| 2016/0083104 A1* | 3/2016 | Simonetti | B64D 41/00 |
| | | | 701/3 |
| 2016/0207623 A1* | 7/2016 | Carson | B64C 27/04 |

OTHER PUBLICATIONS

European Search Report; Application No. EP 18157736.2; European Patent Office; dated Apr. 19, 2018.
European Exam Report; Application No. EP 18157736.2; European Patent Office; dated Mar. 7, 2019.

* cited by examiner

POWER ALLOCATION SYSTEMS FOR AIRCRAFT

TECHNICAL FIELD OF THE DISCLOSURE

The present disclosure relates, in general, to power allocation systems operable for use on aircraft and, in particular, to aircraft power allocation systems operable to allocate power output from one or more power sources based on operational parameters of the aircraft, thereby reducing the maximum power output required of the power source.

BACKGROUND

Power sources on board an aircraft typically provide power to several diverse systems. For example, some aircraft include an electrical power system in which a generator provides electrical energy to electrical power consuming systems and components, such as lighting, communication and cooling systems. Some aircraft include a hydraulic power system in which a pump provides hydraulic energy to hydraulic power consuming systems and components, such as braking, landing gear and control surface systems. Each of these power consuming systems has a maximum power requirement, which the power consuming system may demand at any time depending on the operational circumstances. For example, the anti-torque system of a helicopter may require little or no power during forward flight above a certain speed, but requires maximum power during sideward flight. Traditionally, aircraft power sources, such as generators and hydraulic pumps, have been sized to provide a power output large enough to meet the maximum demands of all of the aircraft's power consuming systems at once. Because it is rare for all power consuming systems to demand their maximum power requirement at the same time, the power sources on board the aircraft may be larger, more expensive and heavier than is necessary in most operational circumstances, adversely impacting aircraft performance. Accordingly, a need has arisen for improved power allocation systems that reduce the power output requirement of an aircraft power source while still meeting the operational needs of the aircraft, thereby reducing the overall cost and weight of the aircraft.

SUMMARY

In a first aspect, the present disclosure is directed to a power system for an aircraft including a plurality of power consumers each operable to consume power in a range from zero to maximum power demand and collectively capable of consuming a combined maximum power demand, a power source operable to output power to the power consumers and a power allocation system operable to allocate power from the power source to the power consumers based on an operational parameter of the aircraft. The power allocated by the power allocation system is less than the combined maximum power demand of the power consumers, thereby allowing the power source to have a maximum power output less than the combined maximum power demand of the power consumers.

In some embodiments, the power allocation system may include a maneuver detection module operable to detect a maneuver of the aircraft and a power allocator operable to allocate power from the power source to the power consumers based on the maneuver. In certain embodiments, the power consumers may include first and second power consumers, and the power allocator may allocate increased power output to the first power consumer and decreased power output to the second power consumer in response to the maneuver detection module detecting the maneuver of the aircraft. The increased power output may be substantially equal to the maximum power demand of the first power consumer. In some embodiments, the first power consumer may be an anti-torque system, the second power consumer may be one or more occupant comfort systems and the maneuver detection module may detect a sideward flight maneuver of the aircraft, such as right sideward flight. The power allocator may also substantially prevent power output to the one or more occupant comfort systems in response to detecting the sideward flight maneuver. In certain embodiments, the power system may include one or more sensors operable to obtain sensor data, and the maneuver detection module may be operable to detect the maneuver using the sensor data. In some embodiments, the aircraft may be a helicopter and the power consumers may include an anti-torque system. In such embodiments, the power allocator may be operable to allocate decreased power output to the anti-torque system in response to the maneuver detection module detecting a forward flight maneuver exceeding a predetermined threshold speed.

In certain embodiments, the power allocation system may include a mission identification module operable to identify a mission of the aircraft and a power allocator operable to allocate power from the power source to the power consumers based on the mission. In some embodiments, the mission may be manually inputted. In certain embodiments, the power system may include one or more sensors operable to obtain sensor data, and the mission identification module may be operable to detect the mission using the sensor data. In some embodiments, the power consumers may include first and second power consumers and the power allocator may allocate increased power output to the first power consumer and decreased power output to the second power consumer in response to the mission identification module identifying the mission of the aircraft. In other embodiments, the mission may be an emergency landing mission, and the power allocator may be operable to allocate increased power output to the first power consumer and decreased power output to the second power consumer in response to the mission identification module identifying the emergency landing mission. In certain embodiments, the second power consumer may be an anti-torque system, a cooling system, an occupant comfort system, a communication system, an interface system, a lighting system and/or an active vibration control system.

In some embodiments, the power allocation system may include a power consumption detection module operable to detect a power consumption of each of the power consumers and a power allocator operable to allocate power from the power source to the power consumers based on the power consumption of at least one of the power consumers. In certain embodiments, the power consumers may include first and second power consumers, and the power allocator may be operable to allocate decreased power output to the second power consumer in response to the power consumption detection module detecting an increased power consumption of the first power consumer. In some embodiments, the first power consumer may be an anti-torque system. In certain embodiments, the second power consumer may be one or more occupant comfort systems. In such embodiments, the power allocator may substantially cease power output to the occupant comfort systems in response to the power consumption of the anti-torque system exceeding a predetermined threshold. In certain embodiments, the aircraft may be a rotorcraft having at least one rotor and a rotor gearbox, and the second power consumer may include one or more cooling systems including a rotor gearbox cooling fan. In such embodiments, the rotorcraft may be a helicopter having a main rotor and a main rotor gearbox, and the rotor gearbox cooling fan may be a main rotor gearbox cooling fan. In some embodiments, the power system may include one or more sensors operable to obtain sensor data, and the power allocation system may be operable to detect downwash from the main rotor and/or ram air proximate to the main rotor gearbox using the sensor data. In such embodiments, the power output to the main rotor gearbox cooling fan may be inversely proportional to downwash from the main rotor and/or ram air proximate to the main rotor gearbox.

In certain embodiments, the power allocation system may include a tiered power allocator operable to categorize the power consumers into a plurality of tiers based on the operational parameter of the aircraft. The plurality of tiers may include an essential tier and a non-essential tier. In such embodiments, the tiered power allocator may allocate power output to the power consumers in the essential tier and substantially prevent power output to the power consumers in the non-essential tier. In some embodiments, the plurality of tiers may include a partially-essential tier, and the power output to the power consumers in the partially-essential tier may be subject to reduction by the tiered power allocator. In certain embodiments, the power consumers may include at least two of the following power consumers: an anti-torque system, a cooling system, an occupant comfort system, a communication system, an interface system, a lighting system and an active vibration control system. In some embodiments, the power allocation system may be an electrical power allocation system, the power consumers may be electrical power consumers and the power source may be a generator. In certain embodiments, the power allocation system may be a hydraulic power allocation system, the power consumers may be hydraulic power consumers and the power source may be a hydraulic pump.

In a second aspect, the present disclosure is directed to an aircraft including a fuselage, a flight control computer disposed within the fuselage and a power system disposed within the fuselage. The power system includes a plurality of power consumers each operable to consume power in a range from zero to maximum power demand and collectively capable of consuming a combined maximum power demand, a power source operable to output power to the power consumers and a power allocation system operable to allocate power from the power source to the power consumers based on an operational parameter of the aircraft. The flight control computer implements the power allocation system. The power allocated by the power allocation system is less than the combined maximum power demand of the power consumers, thereby allowing the power source to have a maximum power output less than the combined maximum power demand of the power consumers.

In some embodiments, the combined maximum power demand of the power consumers may be a summation of the maximum power demands of each of the power consumers. In certain embodiments, the power system may be an electrical power system, the power allocation system may be an electrical power allocation system, the power consumers may be electrical power consumers and the power source may be a generator. In some embodiments, the power system may be a hydraulic power system, the power allocation system may be a hydraulic power allocation system, the power consumers may be hydraulic power consumers and the power source may be a hydraulic pump. In certain embodiments, the aircraft may include a flight control computer implementing the power allocation system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
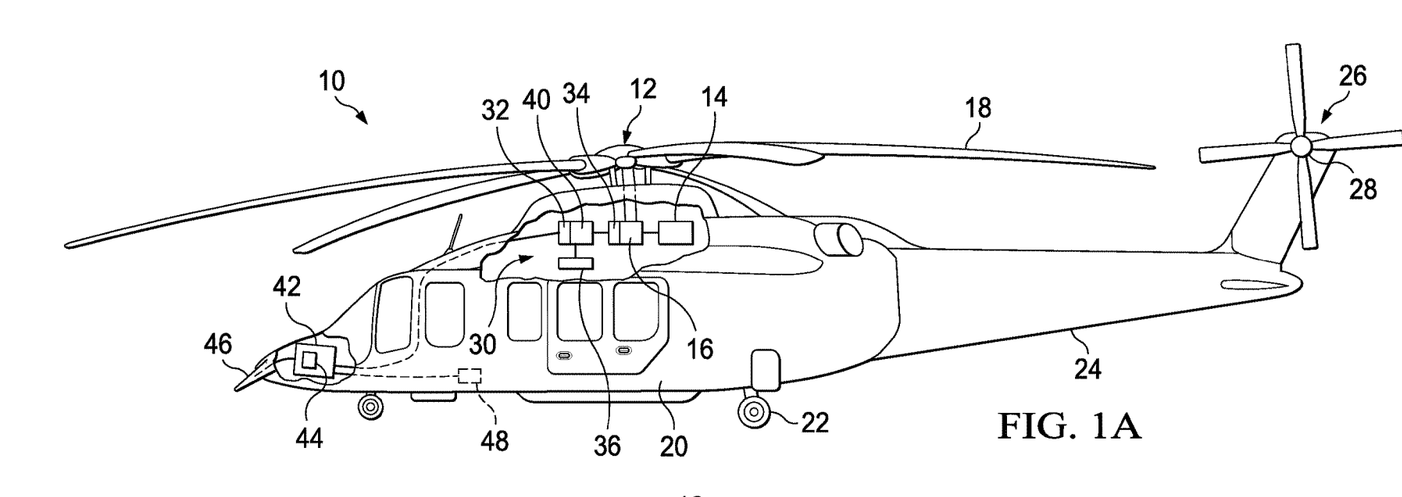
FIGS. 1A-1B are schematic illustrations of a rotorcraft including a power system in accordance with embodiments of the present disclosure.
Figure 1B:
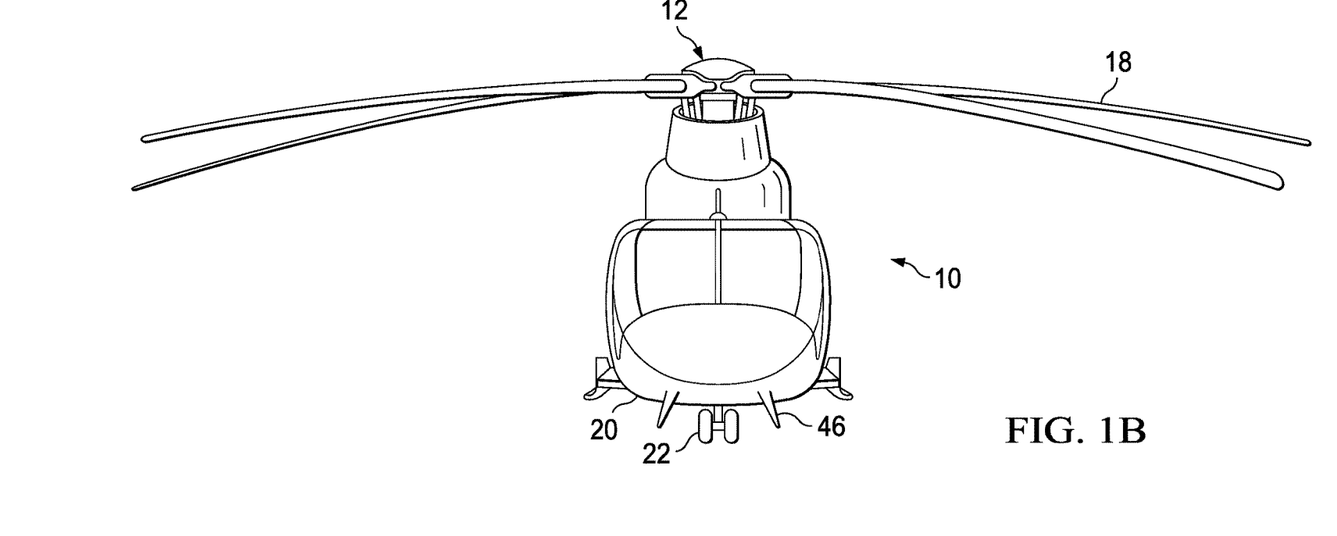

Referring to FIGS. 1A-1B in the drawings, a rotorcraft is schematically illustrated and generally designated 10. Rotorcraft 10 is a helicopter having a main rotor 12 powered by an engine 14 via a main rotor gearbox 16. Main rotor 12 includes a plurality of rotor blade assemblies 18. Main rotor 12 is rotatable relative to a fuselage 20. The pitch of rotor blade assemblies 18 can be collectively and/or cyclically manipulated to selectively control direction, thrust and lift of rotorcraft 10. A landing gear system 22 provides ground support for rotorcraft 10. A tailboom 24 extends from fuselage 20. An anti-torque system 26 includes a tail rotor 28 that is rotatably coupled to the aft portion of tailboom 24. Anti-torque system 26 controls the yaw of rotorcraft 10.

Rotorcraft 10 includes a power system 30. Power system 30 may be an electrical, hydraulic, mechanical or other type of power system. Power system 30 includes power consumers 32, 34, 36, which are each operable to consume power in a range from zero power consumption to a maximum power demand, or requirement. Power consumers 32, 34, 36 are collectively capable of consuming a combined maximum power demand, which may be a summation or total of the respective maximum power demands of power consumers 32, 34, 36. Power system 30 includes a power source 40, such as a generator or hydraulic pump. Engine 14 provides rotational mechanical energy to power source 40, which in turn outputs energy, such as electrical or hydraulic energy, to power consumers 32, 34, 36. Rotorcraft 10 includes a flight control computer 42 on which a power allocation system 44 is implemented or executed. Power allocation system 44 is operable to allocate power from power source 40 to power consumers 32, 34, 36 based on an operational parameter of rotorcraft 10. The operational parameter may be determined or identified based on manual input, sensors 46, 48 or other criteria.

Previous aircraft have traditionally included power sources with enough power output to supply the aircraft's power consumers with their combined maximum power demand, under the assumption that the power source must be able to simultaneously supply each power consumer with its maximum power requirement. In practice, however, it is rare for all power consumers on board an aircraft to demand their respective maximum power demands from the power source at once. Thus, the power source does not utilize its maximum power output during most of its operational life, and is therefore larger and heavier than required. Power allocation system 44 addresses this problem by allocating or distributing power from power source 40 based on operational parameters of rotorcraft 10 such that the power allocated by power allocation system 44 is less than the combined maximum power demand of power consumers 32, 34, 36. Power allocation system 44 allows rotorcraft 10 to carry a power source that has less power output than the combined maximum power demands of power consumers 32, 34, 36, while still meeting the operational needs of rotorcraft 10. In some circumstances, the size, weight and/or power output of engine 14 may also be reduced since the mechanical input required for power source 40 is smaller.

By way of a specific non-limiting example, anti-torque system 26 may have a maximum power demand of 300 horsepower, power consumer 36 may be an occupant cabin air conditioning unit having a maximum power demand of 20 horsepower, power consumer 34 may be a main rotor gearbox cooling fan having a maximum power demand of 30 horsepower and power consumer 32 may be a generator cooling fan having a maximum power demand of 15 horsepower. Power source 40 is an electrical generator. In this example, previous aircraft would have been required to carry a generator capable of supplying 365 horsepower, under the assumption that the generator must be sized to accommodate the maximum power demands of each power consumer simultaneously. By taking into account the operational needs of rotorcraft 10, power allocation system 44 lowers the power output requirement of generator 40. To continue the example above, power allocation system 44 may detect that rotorcraft 10 is performing a right sideward flight maneuver (i.e., an operational parameter). During a right sideward flight maneuver, rotorcraft 10 either flies sideward to the right or experiences an equivalent wind or gust that opposes tail rotor 28 and causes anti-torque system 26 to operate at increased power. During right sideward flight, the maximum power demand (300 horsepower) of anti-torque system 26 is required of generator 40. The rotor downwash and ram air proximate to main rotor gearbox 16 provide sufficient cooling for main rotor gearbox 16, allowing power allocation system 44 to allocate zero power to main rotor gearbox cooling fan 34. Sideward ram air and rotor downwash may provide some cooling for generator 40, but power output from generator 40 may still be required for generator cooling fan 32 to sufficiently cool generator 40. Finally, power allocation system 44 may turn off air conditioning unit 36 during right sideward flight. Thus, power allocation system 44 allocates up to 315 horsepower from generator 40 during right sideward flight. For all other maneuvers of rotorcraft 10 that do not involve right sideward flight, anti-torque system 26 requires less than 235 horsepower, allowing generator cooling fan 32, main rotor gearbox cooling fan 34 and air-conditioning unit 36 to demand their respective maximum power demands at any time. In this non-limiting example, power allocation system 44 allocates power so as to allow rotorcraft 10 to carry a generator capable of a 315 horsepower maximum output as opposed to the 365 horsepower generator required by previous aircraft.

It should be appreciated that rotorcraft 10 is merely illustrative of a variety of aircraft that can implement the embodiments disclosed herein. Indeed, power allocation system 44 may be implemented on any aircraft that utilizes energy or power. Other aircraft implementations can include hybrid aircraft, tiltrotor aircraft, tiltwing aircraft, quad tiltrotor aircraft, unmanned aircraft, gyrocopters, airplanes and the like. Power allocation system 44 may also be utilized on rotorcraft having a distributed propulsion system with two or more rotors powered by an electrical, hydraulic, mechanical or other energy source. As such, those skilled in the art will recognize that power allocation system 44 can be integrated into a variety of aircraft configurations. It should be appreciated that even though aircraft are particularly well-suited to implement the embodiments of the present disclosure, non-aircraft vehicles and devices can also implement the embodiments.

Figure 2A:
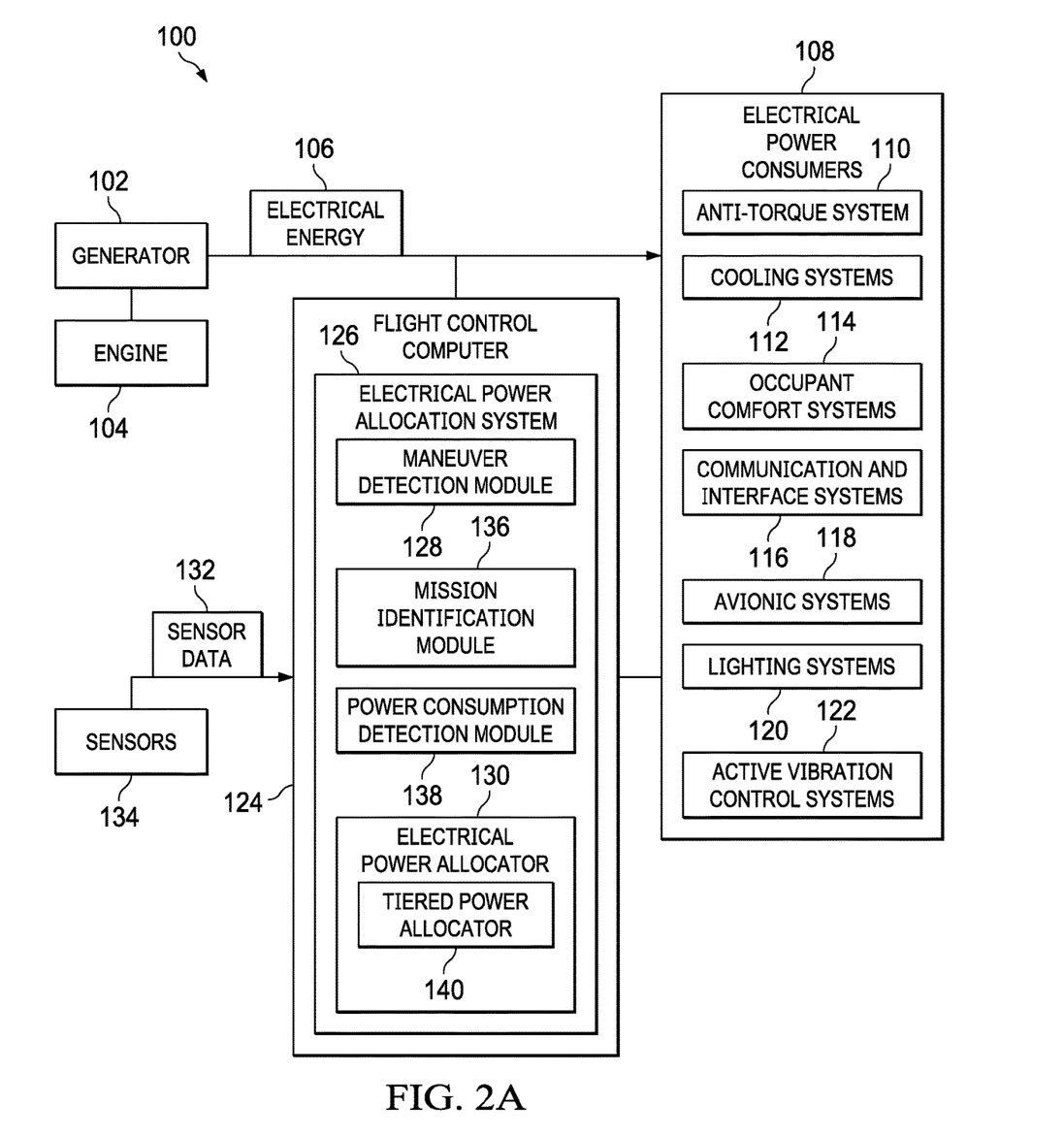
FIGS. 2A-2C are schematic illustrations of an electrical power system for an aircraft in accordance with embodiments of the present disclosure.
Figure 2B:
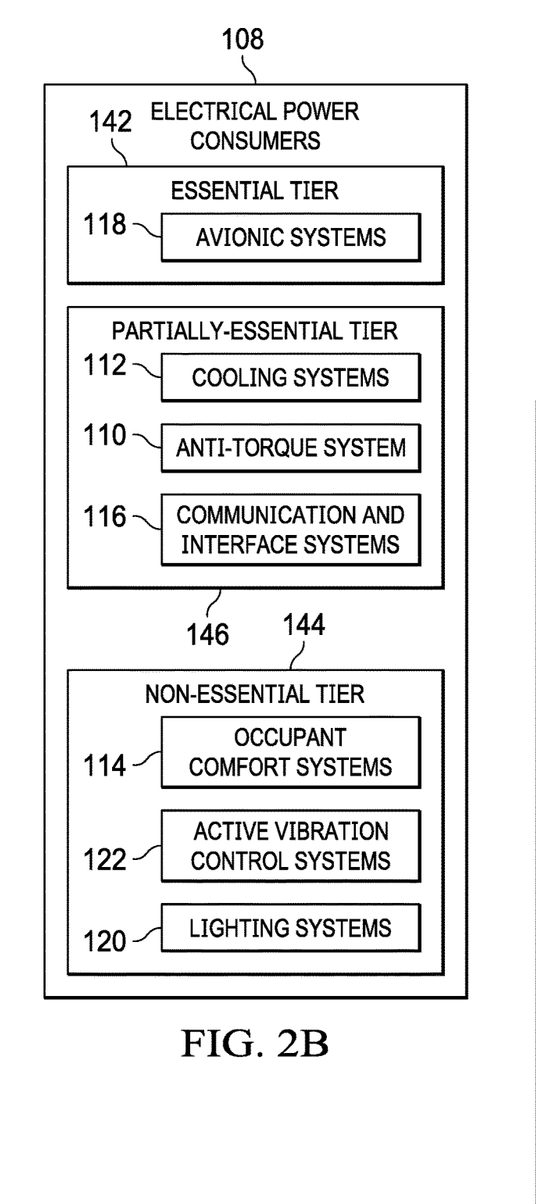
Figure 2C:
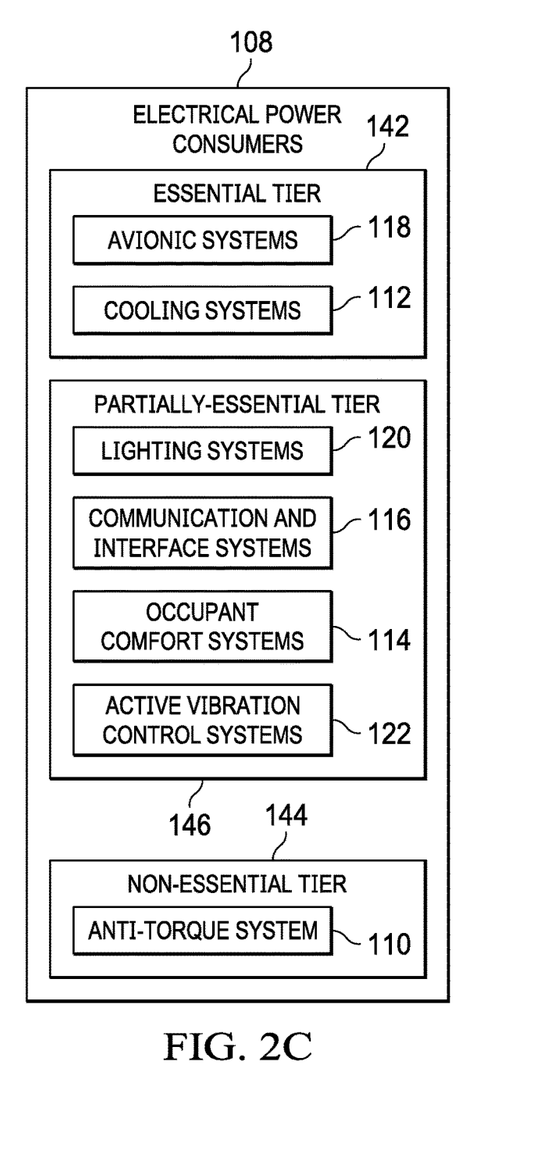

Referring to FIGS. 2A-2C of the drawings, an electrical power system for an aircraft is schematically illustrated and generally designated 100. Electrical power system 100 includes one or more generators 102 powered by one or more engines 104. Although generator 102 is powered by engine 104 in the illustrated embodiment, generator 102 may be powered in numerous ways, including by chemical, solar, hydraulic, wind or other energy generation methods. Generator 102 outputs power, or electrical energy 106, to electrical power consumers 108. Collectively, electrical power consumers 108 are capable of consuming a combined maximum power demand, or requirement, which is a total of the maximum power demands of each of electrical power consumers 108. Electrical power consumers 108 may include anti-torque system 110, cooling systems 112, occupant comfort systems 114, communication and interface systems 116, avionic systems 118, lighting systems 120 and active vibration control systems 122. Cooling systems 112 may include cooling fans for generator 102 or gearboxes, such as a main rotor gearbox, which may be used to cool the oil in these components. Occupant comfort systems 114 may include components intended to enhance the comfort of occupants in the aircraft, such as an air conditioning unit. Communication and interface systems 116 may include systems intended to interface with an occupant of the aircraft, such as a radio communication system or cockpit display. Avionic systems 118 may include systems related to the avionics of the aircraft, such as control surface movement. In hybrid or fully electric rotorcraft, avionic systems 118 may include a rotor, such as the main rotor of a helicopter. Lighting systems 120 may include interior or exterior lighting on the aircraft. Active vibration control systems 122 may include active vibration isolators intended to isolate vibration originating at a component of the aircraft to prevent such vibration from spreading to other components of the aircraft, such as an active vibration isolator interposed between the main rotor and fuselage of a helicopter. It will be appreciated by one of ordinary skill in the art that any device or system capable of consuming electrical energy 106 may be an electrical power consumer 108. For example, electrical power consumers 108 may include onboard medical equipment for an Emergency Medical Services (EMS) aircraft.

Electrical power system 100 includes flight control computer 124, which may also be one of electrical power consumers 108. Flight control computer 124 implements or executes electrical power allocation system 126. Electrical power allocation system 126 allocates power from generator 102 to electrical power consumers 108 based on an operational parameter of the aircraft. The power allocated by electrical power allocation system 126 is less than the combined maximum power demand of electrical power consumers 108, allowing generator 102 to have a maximum power output that is less than, and does not exceed, the combined maximum power demand of electrical power consumers 108. Electrical power allocation system 126 may allocate power from generator 102 to electrical power consumers 108 based on a diverse variety of aircraft operational parameters.

In some embodiments, electrical power allocation system 126 includes maneuver detection module 128. Maneuver detection module 128 is operable to detect a maneuver of the aircraft. Electrical power allocation system 126 also includes an electrical power allocator 130. The maneuver detected by maneuver detection module 128 may be the operational parameter used by electrical power allocator 130 to allocate power from generator 102 to electrical power consumers 108. In some embodiments, maneuver detection module 128 may detect the maneuver being performed by the aircraft using sensor data 132 from sensors 134 on board the aircraft. Sensors 134 may include any number or combination of the following sensors: a ram air sensor, rotor downwash sensor, airspeed sensor, altitude sensor, attitude sensor, wind velocity sensor, cyclic control position sensor, collective control position sensor, roll rate sensor, yaw rate sensor, pitch rate sensor, acceleration sensor, such as a normal, lateral and/or longitudinal acceleration sensor, swashplate angle sensor, rotor flapping sensor, mechanical failure sensor, health monitoring system, descent rate sensor, traffic alert sensor or any other sensor suitable to perform the illustrative embodiments disclosed herein. In other embodiments, the maneuver being performed by the aircraft may be determined based on the power consumption of each electrical power consumer 108 or other component of the aircraft. The maneuver may also be manually inputted by a pilot or from elsewhere.

In some embodiments, electrical power allocator 130 allocates increased power output to anti-torque system 110 and decreased power output to one or more of the other electrical power consumers 108 in response to maneuver detection module 128 detecting a sideward flight maneuver, such as a right sideward flight maneuver. The increased power output allocated to anti-torque system 110 may be substantially equal to the maximum power demand, or requirement, of anti-torque system 110. To lower the overall power consumption of electrical power consumers 108, electrical power allocator 130 may reduce or substantially prevent power output to one or more occupant comfort systems 114, such as an air conditioning unit, during the sideward flight maneuver. Electrical power allocator 130 may also decrease power output to cooling systems 112 in proportional relation to the amount of rotor downwash or ram air proximate to the components cooled by cooling systems 112. In embodiments in which electrical power system 100 is implemented on a helicopter, electrical power allocator 130 may allocate decreased power output to anti-torque system 110 in response to maneuver detection module 128 detecting a forward flight maneuver exceeding a predetermined threshold speed. Indeed, because the control surfaces and fins on the tail section of a helicopter provide yaw control, it may be possible for electrical power allocator 130 to allocate little or no power to anti-torque system 110 if the helicopter is flying forward at sufficient speed. During some maneuvers, such as some landing maneuvers, electrical power allocator 130 reduces or ceases power allocation to the non-avionic systems of electrical power consumers 108, which may include systems not directly related to the avionics of the aircraft. Power to the non-avionic systems may be shut off completely without compromising the avionics of the aircraft, allowing the aircraft to save power in extraordinary circumstances, such as during an emergency landing maneuver.

Electrical power allocation system 126 includes a mission identification module 136 operable to identify a mission of the aircraft. The mission identified by the mission identification module 136 is an operational parameter that is used by electrical power allocator 130 to allocate power from generator 102 to electrical power consumers 108. Mission-specific power allocation customizes power allocation for the mission being executed by the aircraft. For example, the power required to land safely may be different than the power required to complete a full military mission in that each mission requires a different allocation of power amongst electrical power consumers 108. The mission may be identified by mission identification module 136 in numerous ways. In some embodiments, the mission may be manually inputted by a pilot or from elsewhere. In other embodiments, mission identification module 136 may identify the mission using sensor data 132 from sensors 134.

In one non-limiting example, mission identification module 136 may identify an emergency landing mission. Mission identification module 136 may identify the emergency landing mission based on sensor data 132 from one or more of sensors 134, such as a mechanical failure sensor, health monitoring system, acceleration sensor and/or descent rate sensor. During the emergency landing mission, power allocated to avionic systems 118, especially those essential for landing, may be maintained or increased. Conversely, the power allocated to systems or components that are non-essential to landing safely, including some non-avionic systems, may be reduced or stopped altogether. Electrical power allocator 130 may also allocate reduced or zero power to anti-torque system 110, cooling systems 112, occupant comfort systems 114, communication and interface systems 116, lighting systems 120 and/or active vibration control systems 122. In another example, if the mission identified by mission identification module 136 involves sideward flight, such as right sideward flight, electrical power allocator 130 may maintain or increase power to anti-torque system 110 while reducing power to one or more of the other electrical power consumers 108, such as occupant comfort systems 114 or cooling systems 112 depending on the amount of ram air or rotor downwash available. By way of further example, if mission identification module 136 identifies a mission involving forward flight above a certain threshold speed, electrical power allocator 130 may allocate little or no power to anti-torque system 110.

In some embodiments, electrical power allocation system 126 includes a power consumption detection module 138 operable to detect the power consumption of each electrical power consumer 108. The power consumption of at least one of electrical power consumers 108 may be an operational parameter used by electrical power allocator 130 to allocate power from generator 102 to electrical power consumers 108. In some embodiments, electrical power allocator 130 allocates decreased power output to one or more electrical power consumers 108 in response to power consumption detection module 138 detecting an increased power consumption of a different one or more electrical power consumers 108. For example, electrical power allocator 130 may allocate decreased power output to one or more occupant comfort systems 114 in response to power consumption detection module 138 detecting an increased power consumption of anti-torque system 110, as may occur during sideward flight of a helicopter. In this example, if power consumption detection module 138 detects that the power consumption of anti-torque system 110 exceeds a predetermined threshold, electrical power allocator 130 may reduce or substantially cease power output to occupant comfort systems 114 or other electrical power consumers 108. If electrical power system 100 is implemented on a rotorcraft having at least one rotor and a rotor gearbox, electrical power allocator 130 may decrease power output to the rotor gearbox cooling fan, which is one of cooling systems 112, in response to power consumption detection module 138 detecting an increased power consumption of another one of electrical power consumers 108. In a more specific example, if the rotorcraft is a helicopter, power allocation to a main rotor gearbox cooling fan may be reduced in this manner. In this example, the power output to the main rotor gearbox cooling fan may be inversely proportional to the amount of rotor downwash from the main rotor and/or ram air proximate to the main rotor gearbox. Downwash from the main rotor and ram air proximate to the main rotor gearbox may be detected by electrical power allocation system 126 using sensor data 132 from sensors 134.

In some embodiments, electrical power allocator 130 includes a tiered power allocator 140. Referring to FIG. 2A in conjunction with FIGS. 2B and 2C, tiered power allocator 140 categorizes electrical power consumers 108 into tiers 142, 144, 146 based on an operational parameter of the aircraft. The tiers include essential tier 142 and non-essential tier 144. Tiered power allocator 140 allocates power output to the electrical power consumers in essential tier 142 and substantially prevents power output to the electrical power consumers in non-essential tier 144. The tiers may also include partially-essential tier 146. Power output to the electrical power consumers in partially-essential tier 146 is subject to reduction by tiered power allocator 140. Categorization into tiers by tiered power allocator 140 may be based on the mission identified by mission identification module 136, a maneuver identified by maneuver detection module 128, the power consumption of electrical power consumers 108 as measured by power consumption detection module 138 or any other operational parameter of the aircraft. Operational parameters that may trigger categorization of electrical power consumers 108, and power allocation thereto, by tiered power allocator 140 may also include detection of an aircraft malfunction by sensors 134 and/or input from a pilot or from elsewhere.

In one non-limiting example, a mechanical failure sensor or health monitoring system may detect a severe malfunction forcing the aircraft to make an emergency landing. Severe malfunctions include, for example, engine failure or structural breach of the aircraft. Tiered power allocator 140 may categorize electrical power consumers 108 into tiers in response to detection of the serious malfunction so as to allocate power to electrical power consumers 108 only to the extent necessary to make an emergency landing. FIG. 2B illustrates one non-limiting example of the categorization of electrical power consumers 108 by tiered power allocator 140 in response to the need to make an emergency landing. Essential tier 142 includes avionic systems 118 to ensure that the aircraft can utilize avionic systems required to land safely. In embodiments in which the aircraft is a hybrid or fully electric helicopter, avionic systems 118 may include the main rotor system. In some embodiments, portions of the cockpit display may be included in essential tier 142 so that the pilot is able to effectively use his or her instruments. Non-essential tier 144 includes occupant comfort systems 114, active vibration control systems 122 and lighting systems 120. Tiered power allocator 140 may allocate zero power to the electrical power consumers in non-essential tier 144. Specific components that may be included in non-essential tier 144 include an air conditioning unit, non-essential cockpit display, kits and/or a radio communication system. Electrical power consumers subject to a reduction in allocated power are categorized into partially-essential tier 146, which may include cooling systems 112, anti-torque system 110 and communication and interface systems 116. For an emergency landing mission, essential tier 142 may include electrical power consumers that are needed to land safely, partially-essential tier 146 may include electrical power consumers that are able to receive reduced or zero power while landing safely and non-essential tier 144 may include electrical power consumers intended mainly for the comfort of the occupants in the aircraft. In yet another example, during an emergency landing, non-avionic systems may be categorized into non-essential tier 144 and avionic systems 118 may be categorized into essential tier 142.

The position of electrical power consumers 108 within each tier 142, 144, 146 may change based on an operational parameter of the aircraft. Anti-torque system 110 may move to essential tier 142 if the aircraft is engaging in a full mission in which yaw control is necessary. In another example, if the aircraft is engaged in sideward flight, anti-torque system 110 may be promoted to essential tier 142. In yet another example shown in FIG. 2C, a helicopter is engaged in forward flight above a threshold speed under healthy, non-malfunctioning operating conditions. In this scenario, essential tier 142 includes avionic systems 118 and cooling systems 112, partially-essential tier 146 includes lighting systems 120, communication and interface systems 116, occupant comfort systems 114 and active vibration control systems 122 and non-essential tier 144 includes anti-torque system 110. Anti-torque system 110 may alternatively be included in partially-essential tier 146 if reduced, instead of zero, power is allocated to anti-torque system 110. In other embodiments, instead of allocating zero power to the electrical power consumers in non-essential tier 144, tiered power allocator 140 may allocate power from a battery (not shown) on board the aircraft to the electrical power consumers in non-essential tier 144. In such embodiments, zero power may be allocated to the electrical power consumers in non-essential tier 144 if the battery is depleted below a predetermined threshold. Also in such embodiments, the battery may be recharged, by generator 102 or from elsewhere, in response to the power demand of the electrical power consumers 108 dropping below a predetermined threshold.

In some embodiments, generator 102 may include two or more generators, the combined maximum power output of which may be less than or more than the combined maximum power demand of electrical power consumers 108. For example, the combined maximum power demand of electrical power consumers 108 may be 365 horsepower and the combined maximum power output of the generators may be 300 horsepower. In this example, power allocation system 126 operates as described above to allocate electrical power. In another example, in the event of a failure of one of the generators, electrical power allocation system 126 would allocate the reduced power available from the still-functioning generator or generators. In this case, electrical power allocation system 126 may allocate no power to occupant comfort systems 114, active vibration control systems 122 and/or lighting systems 120 in response to the failure of one of the generators so as to reduce the overall power consumption of electrical power consumers 108 within the power output capability of the still-functioning generator or generators.

Figure 3:
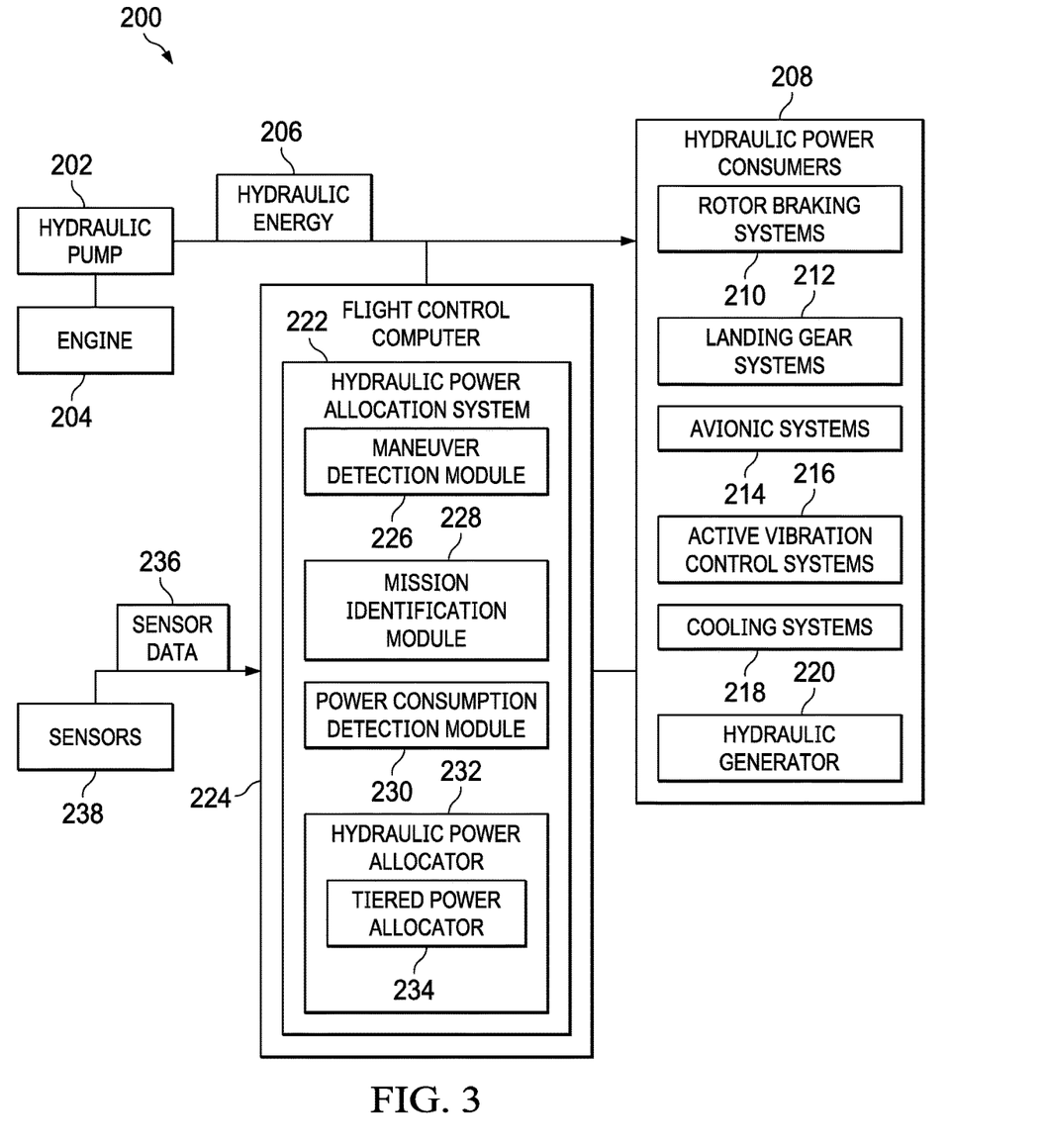
FIG. 3 is a schematic illustration of a hydraulic power system for an aircraft in accordance with embodiments of the present disclosure.

Referring to FIG. 3 in the drawings, a hydraulic power system for an aircraft is schematically illustrated and generally designated 200. Hydraulic power system 200 includes one or more hydraulic pumps 202 powered by engine 204. Hydraulic pump 202 may be powered in numerous ways, including by chemical, solar, electric, wind or other energy generation methods. Hydraulic pump 202 outputs power, or hydraulic energy 206, to hydraulic power consumers 208. Hydraulic power consumers 208 may include rotor braking systems 210, landing gear systems 212, avionic systems 214, active vibration control systems 216, cooling systems 218 and/or hydraulic generator 220. Landing gear systems 212 may include landing gear braking systems, such as disc brakes on the landing wheels of an aircraft. Avionic systems 214 may include flap control and movement of other flight control surfaces, as well as other hydraulic systems and components related to the avionics of the aircraft. In embodiments in which hydraulic power system 200 is implemented on a hydraulically-driven rotorcraft, the rotors of the rotorcraft may be included in avionic systems 214. It will be appreciated by one of ordinary skill in the art that any device or system capable of consuming hydraulic energy 206 may be a hydraulic power consumer 208.

Hydraulic power system 200 includes a hydraulic power allocation system 222, implemented on flight control computer 224, which allocates power to and from hydraulic components of the aircraft. Hydraulic power allocation system 222 includes similar functionality as electrical power allocation system 126 in FIG. 2A, except that hydraulic energy is allocated between hydraulic pump 202 and hydraulic power consumers 208. In particular, hydraulic power allocation system 222 includes maneuver detection module 226, mission identification module 228, power consumption detection module 230 and hydraulic power allocator 232. Hydraulic power allocator 232 includes tiered power allocator 234. Hydraulic power allocation system 222 may utilize sensor data 236 from sensors 238 similar to electrical power allocation system 126 in FIG. 2A. In embodiments in which hydraulic pump 202 includes two or more hydraulic pumps having a combined maximum power output that is less than or greater than the combined maximum power demands of hydraulic power consumers 208, hydraulic power allocation system 222 may allocate power from a reduced number of hydraulic pumps in case of failure of one of the hydraulic pumps. In addition to electrical and hydraulic power systems, the power allocation system of the illustrative embodiments may be used in other energy environments, such as solar, mechanical, wind, fuel cell or other power systems.

Figure 4A:
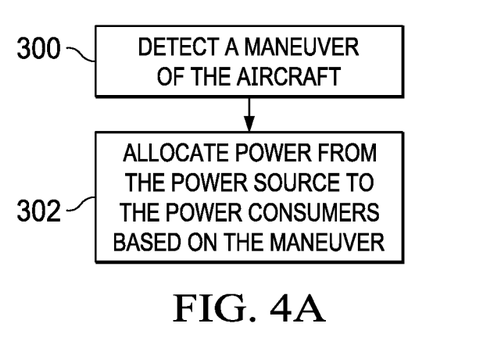
FIGS. 4A-4D are flowcharts of various methods for allocating power from an aircraft power source in accordance with embodiments of the present disclosure.
Figure 4B:
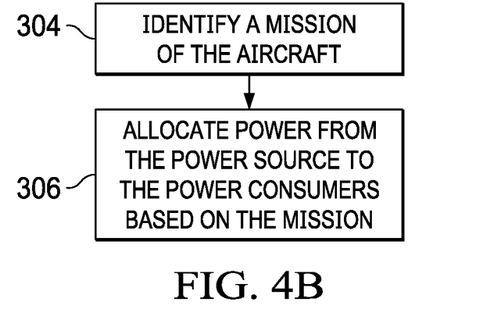
Figure 4C:
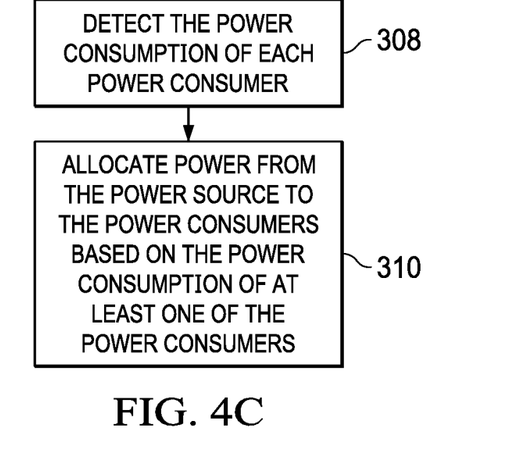
Figure 4D:
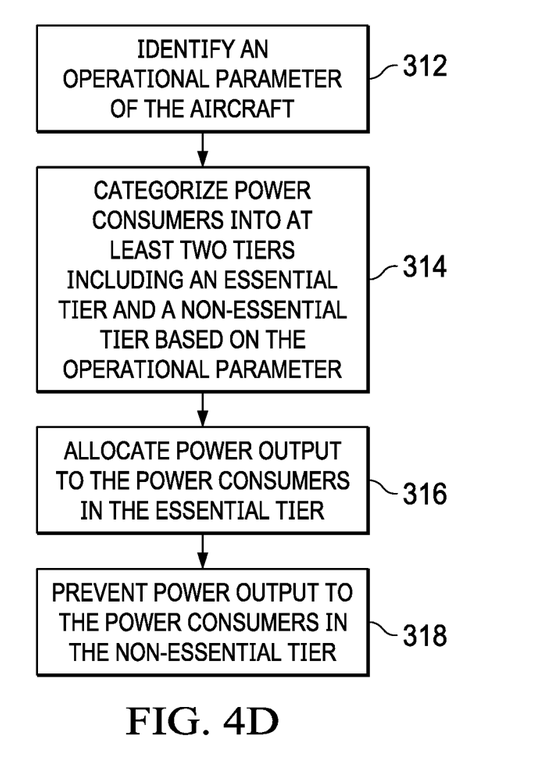

Referring to FIGS. 4A-4D in the drawings, methods for allocating power in a power system by a power allocation system in various embodiments are schematically illustrated. In FIG. 4A, a method for allocating power includes detecting a maneuver of the aircraft (step 300) and allocating power from the power source to the power consumers based on the maneuver (step 302). In FIG. 4B, a method for allocating power includes identifying a mission of the aircraft (step 304) and allocating power from the power source to the power consumers based on the mission (step 306). In FIG. 4C, a method for allocating power includes detecting the power consumption of each power consumer (step 308) and allocating power from the power source to the power consumers based on the power consumption of at least one of the power consumers (step 310). In FIG. 4D, a method for allocating power includes identifying an operational parameter of the aircraft (step 312), categorizing power consumers into at least two tiers including an essential tier and a non-essential tier based on the operational parameter (step 314), allocating power output to the power consumers in the essential tier (step 316) and preventing power output to the power consumers in the non-essential tier (step 318).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The flight control computers of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A power system for an aircraft comprising:
    a plurality of power consumers each operable to consume power in a range from zero to maximum power demand and collectively capable of consuming a combined maximum power demand;
    a power source operable to output power to the power consumers;
    a power allocation system operable to allocate power from the power source to the power consumers based on an operational parameter of the aircraft;
    a maneuver detection module configured to detect a maneuver of the aircraft, the operational parameter further comprising the maneuver;
    a power allocator configured to allocate power from the power source to the power consumers based on the maneuver; and
    one or more sensors configured to obtain sensor data, the maneuver detection module configured to detect the maneuver using the sensor data;
    wherein, the power consumers further comprise an anti-torque system, the power allocator allocating increased power output to the anti-torque system in response to the maneuver detection module detecting the maneuver of the aircraft; and
    wherein, the power allocated by the power allocation system is less than the combined maximum power demand of the power consumers, thereby allowing the power source to have a maximum power output less than the combined maximum power demand of the power consumers.

2. The power system as recited in claim 1 wherein the power consumers further comprise a second power consumer and wherein the power allocator allocates decreased power output to the second power consumer in response to the maneuver detection module detecting the maneuver of the aircraft.

3. The power system as recited in claim 1 wherein the increased power output is substantially equal to the maximum power demand of the anti-torque system.

4. The power system as recited in claim 2 wherein the second power consumer further comprises one or more occupant comfort systems and wherein the maneuver detection module detects a right sideward flight maneuver of the aircraft.

5. The power system as recited in claim 1 wherein the power allocation system further comprises:
    a mission identification module operable to identify a mission of the aircraft, the operational parameter further comprising the mission; and
    a power allocator operable to allocate power from the power source to the power consumers based on the mission.

6. The power system as recited in claim 5 wherein the power consumers further comprise second and third power consumers and wherein the power allocator allocates increased power output to the second power consumer and decreased power output to the third power consumer in response to the mission identification module identifying the mission of the aircraft.

7. The power system as recited in claim 5 wherein the power consumers further comprise second and third power consumers and the mission further comprises an emergency landing mission, and wherein the power allocator is operable to allocate increased power output to the second power consumer and decreased power output to the third power consumer in response to the mission identification module identifying the emergency landing mission.

8. The power system as recited in claim 1 wherein the power allocation system further comprises:
    a power consumption detection module operable to detect a power consumption of each of the power consumers, the operational parameter further comprising the power consumption of each of the power consumers; and
    a power allocator operable to allocate power from the power source to the power consumers based on the power consumption of at least one of the power consumers.

9. The power system as recited in claim 8 wherein the power consumers further comprise second and third power consumers, the power allocator operable to allocate decreased power output to the third power consumer in response to the power consumption detection module detecting an increased power consumption of the second power consumer.

10. The power system as recited in claim 9 wherein the second power consumer further comprises the anti-torque system, wherein the third power consumer further comprises one or more occupant comfort systems and wherein the power allocator substantially ceases power output to the one or more occupant comfort systems in response to the power consumption of the anti-torque system exceeding a predetermined threshold.

11. The power system as recited in claim 1 wherein the power allocation system further comprises:
    a tiered power allocator operable to categorize the power consumers into a plurality of tiers based on the operational parameter of the aircraft, the plurality of tiers including an essential tier and a non-essential tier;
    wherein the tiered power allocator allocates power output to the power consumers in the essential tier and substantially prevents power output to the power consumers in the non-essential tier.

12. The power system as recited in claim 11 wherein the plurality of tiers further comprise a partially-essential tier; and
    wherein the power output to the power consumers in the partially-essential tier is subject to reduction by the tiered power allocator.

13. The power system as recited in claim 1 wherein the power consumers further comprise at least two power consumers selected from the group consisting of the anti-torque system, a cooling system, an occupant comfort system, a communication system, an interface system, a lighting system and an active vibration control system.

14. The power system as recited in claim 1 wherein the power allocation system further comprises an electrical power allocation system, the power consumers further comprise electrical power consumers and the power source further comprises a generator.

15. The power system as recited in claim 1 wherein the power allocation system further comprises a hydraulic power allocation system, the power consumers further comprise hydraulic power consumers and the power source further comprises a hydraulic pump.

16. The power system as recited in claim 1 wherein the one or more sensors further comprise a cyclic control position sensor and the maneuver detection module is configured to detect the maneuver using the sensor data from the cyclic control position sensor.

17. The power system as recited in claim 1 wherein the maneuver detection module is configured to detect a sideward flight maneuver using the sensor data.

18. An aircraft comprising:
a fuselage;
a flight control computer disposed within the fuselage; and
a power system disposed within the fuselage, the power system including:
a plurality of power consumers each operable to consume power in a range from zero to maximum power demand and collectively capable of consuming a combined maximum power demand;
a power source operable to output power to the power consumers;
a power allocation system operable to allocate power from the power source to the power consumers based on an operational parameter of the aircraft;
a maneuver detection module configured to detect a maneuver of the aircraft, the operational parameter further comprising the maneuver;
a power allocator configured to allocate power from the power source to the power consumers based on the maneuver; and
one or more sensors configured to obtain sensor data, the maneuver detection module configured to detect the maneuver using the sensor data;
wherein, the power consumers further comprise an anti-torque system, the power allocator allocating increased power output to the anti-torque system in response to the maneuver detection module detecting the maneuver of the aircraft;
wherein the flight control computer implements the power allocation system; and
wherein, the power allocated by the power allocation system is less than the combined maximum power demand of the power consumers, thereby allowing the power source to have a maximum power output less than the combined maximum power demand of the power consumers.

19. The aircraft as recited in claim 18 wherein the power system further comprises an electrical power system, the power allocation system further comprises an electrical power allocation system, the power consumers further comprise electrical power consumers and the power source further comprises a generator.

20. The aircraft as recited in claim 18 wherein the power system further comprises a hydraulic power system, the power allocation system further comprises a hydraulic power allocation system, the power consumers further comprise hydraulic power consumers and the power source further comprises a hydraulic pump.

* * * * *